United States Patent
Watanabe et al.

(10) Patent No.: US 9,932,822 B2
(45) Date of Patent: Apr. 3, 2018

(54) INSIDE MEASURING INSTRUMENT

(71) Applicant: MITUTOYO CORPORATION, Kawasaki-shi, Kanagawa (JP)

(72) Inventors: Hiroyuki Watanabe, Ena (JP); Teppei Ohno, Nakatsugawa (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 149 days.

(21) Appl. No.: 15/006,545

(22) Filed: Jan. 26, 2016

(65) Prior Publication Data

US 2016/0237808 A1   Aug. 18, 2016

(30) Foreign Application Priority Data

Feb. 16, 2015 (JP) .................................. 2015-027800

(51) Int. Cl.
| | | |
|---|---|---|
| *G01B 3/26* | (2006.01) | |
| *E21B 47/08* | (2012.01) | |
| *G01B 3/46* | (2006.01) | |
| *G01B 5/12* | (2006.01) | |

(52) U.S. Cl.
CPC ............... *E21B 47/08* (2013.01); *G01B 3/26* (2013.01); *G01B 3/46* (2013.01); *G01B 5/12* (2013.01)

(58) Field of Classification Search
CPC .......... G01B 3/205; G01B 5/012; G01B 7/02; G01B 3/20; G01B 1/00; G01B 3/18; G01B 5/0014; G01B 2003/1043; G01B 3/46
USPC .................................................. 33/542, 544.2
See application file for complete search history.

(56) References Cited

U.S. PATENT DOCUMENTS

| | | | | |
|---|---|---|---|---|
| 2,443,880 A * | 6/1948 | Emery | ..................... | G01B 5/08 33/544.5 |
| 3,422,540 A * | 1/1969 | Worthen | .................. | G01B 3/18 33/501.4 |
| 4,265,026 A * | 5/1981 | Meyer | ..................... | G01B 3/26 33/501.4 |
| 4,476,634 A | 10/1984 | Yamamoto et al. | | |
| 5,848,479 A * | 12/1998 | MacIndoe | ................ | G01B 3/46 33/520 |
| 6,412,187 B1 * | 7/2002 | Sasaki | .................... | G01B 3/004 33/542 |
| 6,490,805 B1 * | 12/2002 | Forschler | ................ | G01B 3/46 33/542 |
| 9,038,283 B2 * | 5/2015 | Luty | ........................ | G01B 5/12 33/544.5 |
| 2009/0235546 A1 * | 9/2009 | Klepp | ..................... | G01B 3/26 33/502 |
| 2016/0237808 A1 * | 8/2016 | Watanabe | ............... | E21B 47/08 |

FOREIGN PATENT DOCUMENTS

JP          S62-44327 Y2    11/1987

* cited by examiner

*Primary Examiner* — Yaritza Guadalupe-McCall
(74) *Attorney, Agent, or Firm* — Oliff PLC

(57) ABSTRACT

There is provided a thin-bottom type bore gauge having damping unit between a gauge head and a head main body part, and a long life. A head part of a bore gauge includes a head main body part, a measurement spherical face at one end face, and a gauge head slidably provided by penetrating an inside and an outside of the head main body part. The gauge head a spring holding groove carved in a circumferential direction at the other end side, and a compression coil spring is interposed between the spring holding groove and an inside end face of the head main body part.

6 Claims, 7 Drawing Sheets

INSIDE MEASURING INSTRUMENT

INCORPORATION BY REFERENCE

This application is based upon and claims the benefit of priority from Japanese patent application No. 2015-027800, filed on Feb. 16, 2015, the disclosure of which are incorporated herein in its entirety by reference.

BACKGROUND OF THE INVENTION

1. Field of the Invention

The present invention relates to an inside measuring instrument.

2. Description of Related Art

There has been known a bore gauge as an inside measuring instrument which measures an inner diameter of a hole or an inner width dimension of a groove.

The bore gauge measures a displacement of a gauge head by converting the displacement into a displacement of a rod in a direction perpendicular to the gauge head.

As a bore gauge, there has been known a thin-bottom type bore gauge which is suitable for measuring a diameter near a bottom of a shallow hole or a bottomed hole (blind hole) (JP S62-44327 Y).

A thin-bottom type bore gauge will be briefly described.

FIG. 1 is an external view of a bore gauge 100.

FIG. 2 is an enlarged view of a head part 200.

Here, the head part 200 of the bore gauge 100 will be mainly described as a background of the present invention.

FIG. 3 is a cross-sectional view of the head part 200.

FIG. 4 is an exploded perspective view of the head part 200.

The head part 200 of the bore gauge 100 includes a head main body part 300, a lower rod 210, a gauge head 400, an anvil 240, and a guide member 230.

An outer diameter screw part 310 is formed at the upper end of the head main body part 300. The outer diameter screw part 310 is screwed and fixed in one end of a cylindrical body 110. A spindle (not illustrated) is inserted in the cylindrical body 110. The spindle is movably installed in an axial direction. A clamp holder 111 is mounted at the other end of the cylindrical body 110, and the clamp holder 111 holds a stem (not illustrated) of a dial gauge (not illustrated). The dial gauge (not illustrated) detects a moving amount of the spindle (not illustrated).

In the head main body part 300, a first hole 321 is bored along the axial line of the outer diameter screw part 310.

The lower rod 210 is inserted in the first hole 321, and the lower rod 210 and the spindle (not illustrated) are coaxial and movable along the coaxial line. Then, an upper end 211 of the lower rod 210 is in point-contact with a lower end of the spindle (not illustrated), and the lower rod 210 and the spindle (not illustrated) move together.

Note that, a first compression coil spring (not illustrated) is interposed between the lower rod 210 or the spindle (not illustrated) and the cylindrical body 110, and the lower rod 210 or the spindle (not illustrated) is biased downward (to the lower end side of the cylindrical body 110).

A bottom face 302 of the head main body part 300 is machined so as to be flat. Furthermore, a second hole 322, which communicates with the first hole 321 and is orthogonal to the first hole 321, is bored inside the head main body part 300 at the bottom face 302 side. The gauge head 400 is inserted in the second hole 322 and freely moves forward and backward. The forward/backward direction of the gauge head 400 is orthogonal to the moving direction of the spindle (not illustrated) and the lower rod 210.

A right triangular cam 330 is rotatably supported about an axis at a crossing point of the first hole 321 and the second hole 322. The base end of the gauge head 400 is in contact with one cam face of the cam 330, and the lower end of the lower rod 210 is in contact with the other cam face orthogonal to the one cam face. The cam 330 converts a forward/backward moving amount of the gauge head 400 in the right-angle direction and transfers the converted amount to the lower rod 210.

A long groove 420 having a predetermined length along the axial line is provided on the outside face of the gauge head 400, and a tip end of a lock plate 340 is engaged in the long groove 420. The lock plate 340 is pressed in from the bottom face 302 of the head main body part 300.

With the lock plate 340 and the long groove 420, a stopper, which is the forward movement limit and the backward movement limit of the gauge head 400, is formed.

The lower rod 210 or the spindle (not illustrated) is biased downward by the first compression coil spring (not illustrated), and the gauge head 400 is continuously biased in a protruding direction from the head main body part 300.

The anvil 240 is screwed in the head main body part 300 at the opposite side to the gauge head 400.

The guide member 230 is provided slidably in the forward/backward direction of the gauge head 400 at the right side of the head main body part 300 in the drawings. The head main body part 300 has a groove 304 in the center of the end face at the gauge head 400 side and a substantially U-shape viewed from a side. The opening of the groove 304 is parallel. The guide member 230 has a first groove 231 and a substantially U-shape in a plan view. The opening of the first groove 231 is perpendicular. Furthermore, the guide member 230 has a second groove 232 at the lower part of the guide member 230. The second groove 232 is orthogonal to the first groove 231 and has an opening in the lower face.

The guide member 230 is engaged with the groove 304 of the head main body part 300 from the front side (one side) of the head main body part 300. At this time, the first groove 231 and the second groove 232 of the guide member 230 are fitted on the side face of the head main body part 300.

Thus, the guide member 230 is guided to the side face of the head main body part 300 and freely moves forward and backward.

A second compression coil spring 233 is interposed between the guide member 230 and the head main body part 300.

With the function of the second compression coil spring 233, the guide member 230 is continuously biased in a protruding direction from the head main body part 300.

A screw 306 is screwed in the head main body part 300 from the front side (one side). The head of the screw 306 is caught by the front end of the guide member 230, and serves as a stopper for the guide member 230.

While the guide member 230 is being engaged with the head main body part 300, the guide member 230 has a substantially gate shape symmetrical with respect to the center axis of the gauge head 400 so as to cover the gauge head 400 from above. Furthermore, a semicircular protrusion 236, which is a protrusion having a substantially semicircular shape, is integrally formed at the right side of the guide member 230 in the drawings. The center of the semicircular protrusion 236 coincides with the axial line of the gauge head 400, and the periphery of the semicircular protrusion 236 is smoothly round-chamfered. When the semicircular protrusion 236 is being firmly brought into contact with a measurement target surface, such as a hole, the gauge head 400 is to be perpendicularly brought into contact with the measurement target surface. The forward/backward moving amount of the gauge head 400 at this time is transferred to the dial gauge (not illustrated) through the lower rod 210 and the spindle (not illustrated), and a measurement value of an inner diameter is obtained from a value displayed on the dial gauge (not illustrated) accordingly.

In the above described configuration, most of the components of the head part 200 are provided above the axial line of the gauge head 400.

Thus, the size between the axial line of the gauge head 400 and the bottom face 302 of the head main body part 300 is shortened accordingly, and the bore gauge 100 is suitable for measuring a diameter near a bottom of a shallow hole or a blind hole.

Especially, biasing means, such as a spring, is not directly provided at the gauge head 400, and the force of the first compression coil spring (not illustrated) is biased by being indirectly transferred to the gauge head 400 through the lower rod 210 or the spindle (not illustrated). From this point, the size from the center axis of the gauge head 400 to the bottom face 302 is to be shortened.

SUMMARY OF THE INVENTION

When an inner diameter of a hole is measured with the bore gauge 100, the gauge head 400 is being pressed back to the inside by the measurement target surface. Then, the head part 200 in this state is pulled out from the hole, the gauge head 400 is to move forward in the protruding direction with the force of the first compression coil spring (not illustrated). The stopper (the lock plate 340) prevents the gauge head 400 from falling off.

However, when the gauge head 400 collides with the stopper (the lock plate 340), large impact is applied to the stopper (the lock plate 340), the gauge head 400, and the head main body part 300, and then the reaction is applied to the cam 330, the lower rod 210, and the spindle (not illustrated).

After the measurement is repeatedly performed tens of thousands or hundreds of thousands of times, the damage to the components is large, and which affects the life.

Although the bore gauge may have a problem of a product life as described above, damping means have not been provided between the gauge head 400 and the head main body part 300 to maintain a configuration having a thin bottom.

A purpose of the present invention is to provide a thin-bottom type bore gauge having damping means between a gauge head and a head main body part and a long life.

A head part of an inside measuring instrument, which measure an inside of a measurement target object, in an exemplary embodiment of the present invention includes:
  a head main body part; and
  a gauge head which includes a measurement spherical face on one end face and is slidably provided by penetrating an inside and an outside of the head main body part, in which
  the gauge head includes a spring holding groove carved in a circumferential direction at the other end side, and
  a compression coil spring is interposed between the spring holding groove and an inside end face of the head main body part.

In an exemplary embodiment of the present invention, it is preferable that the compression coil spring includes:

a diameter which accepts the gauge head inside thereof, and
a diameter of an end turn part corresponding to the other end of the gauge head is smaller than other parts so as to be fitted on the spring holding groove.

In an exemplary embodiment of the present invention, it is preferable that the head part further includes:
  a rod which is movable in a direction orthogonal to a moving direction of the gauge head; and
  a cam provided between the other end of the gauge head and the rod, and rotatably supported about an axis by the head main body part, in which
  end faces or wholes of the gauge head and the rod are ceramic.

A head part of an inside measuring instrument, which measure an inside of a measurement target object, in an exemplary embodiment of the present invention includes:
  a head main body part;
  a gauge head which includes a measurement spherical face on one end face and is movably provided by penetrating an inside and an outside of the head main body part;
  a rod which is movable in a direction orthogonal to a moving direction of the gauge head; and
  a cam provided between the other end of the gauge head and the rod, and rotatably supported about an axis by the head main body part, in which
  end faces or wholes of the gauge head and the rod are ceramic.

An inside measuring instrument in an exemplary embodiment of the present invention includes the head part.

In an exemplary embodiment of the present invention, it is preferable that the inside measuring instrument further includes:
  biasing means for biasing the rod in a direction toward the cam, in which
  biasing force of the compression coil spring is the same as biasing force of the biasing means or more, and
  the head part further includes:
    a rod which is movable in a direction orthogonal to a moving direction of the gauge head; and
    a cam provided between the other end of the gauge head and the rod, and rotatably supported about an axis by the head main body part.

DETAILED DESCRIPTION

Figure 1:
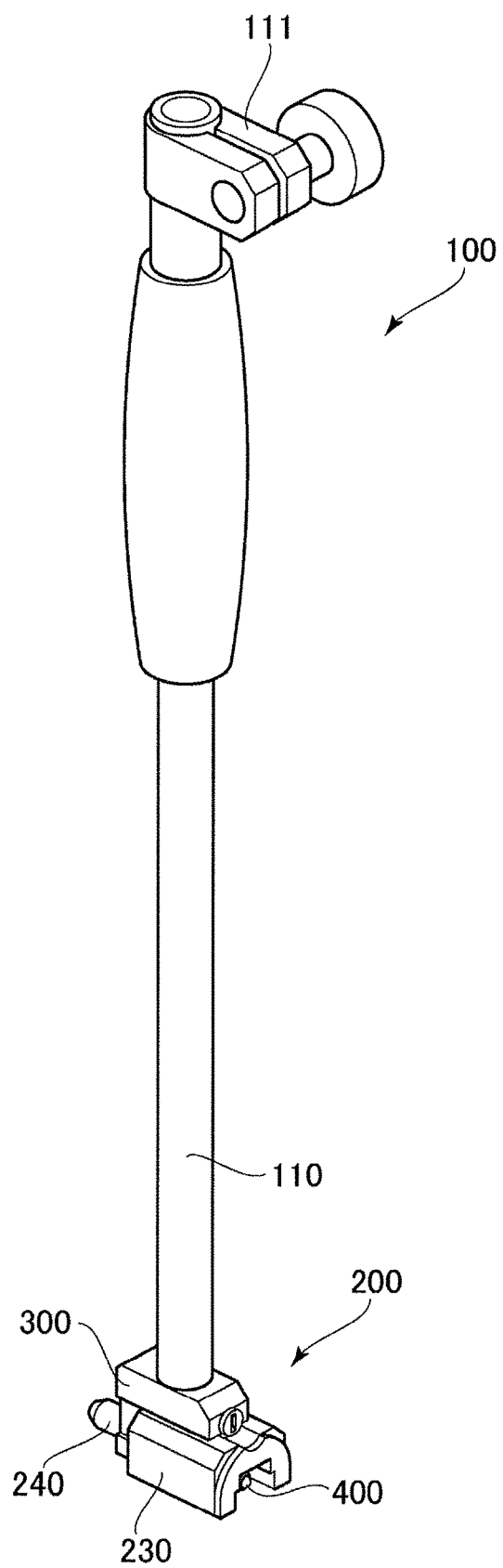
FIG. 1 is an external view of a bore gauge.
Figure 2:
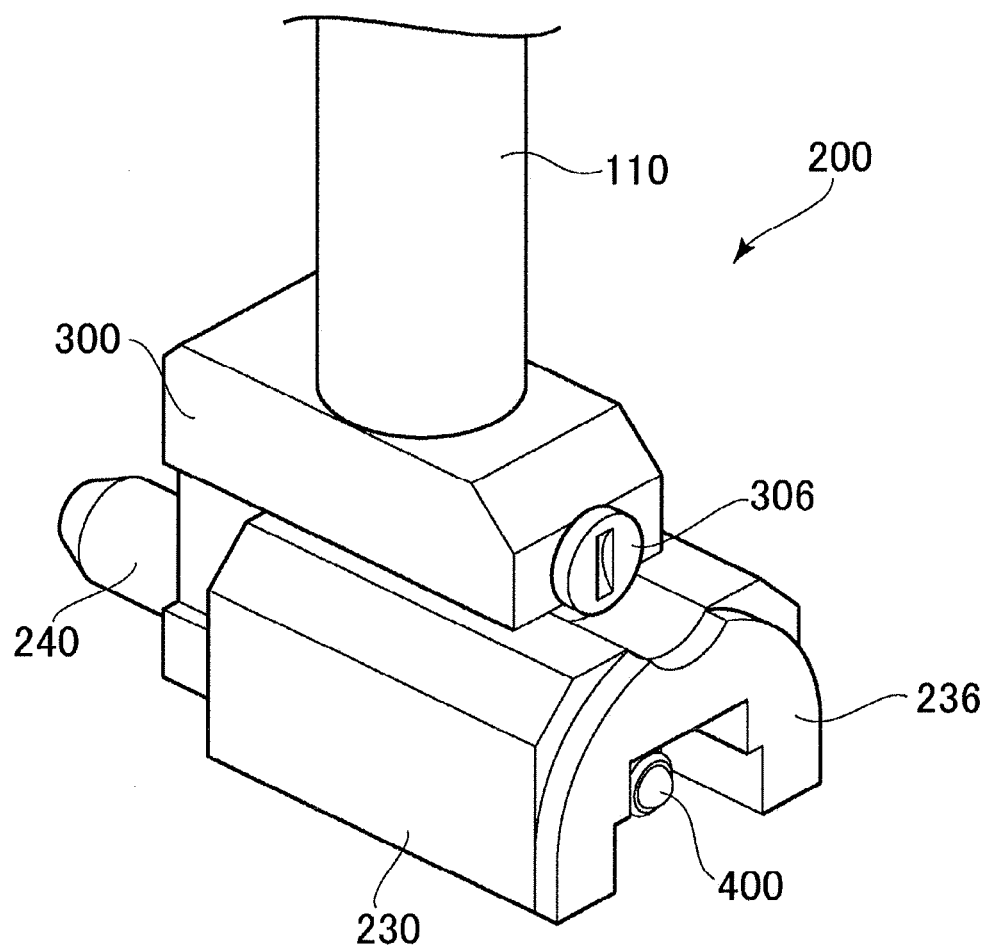
FIG. 2 is an enlarged view of a head part.
Figure 3:
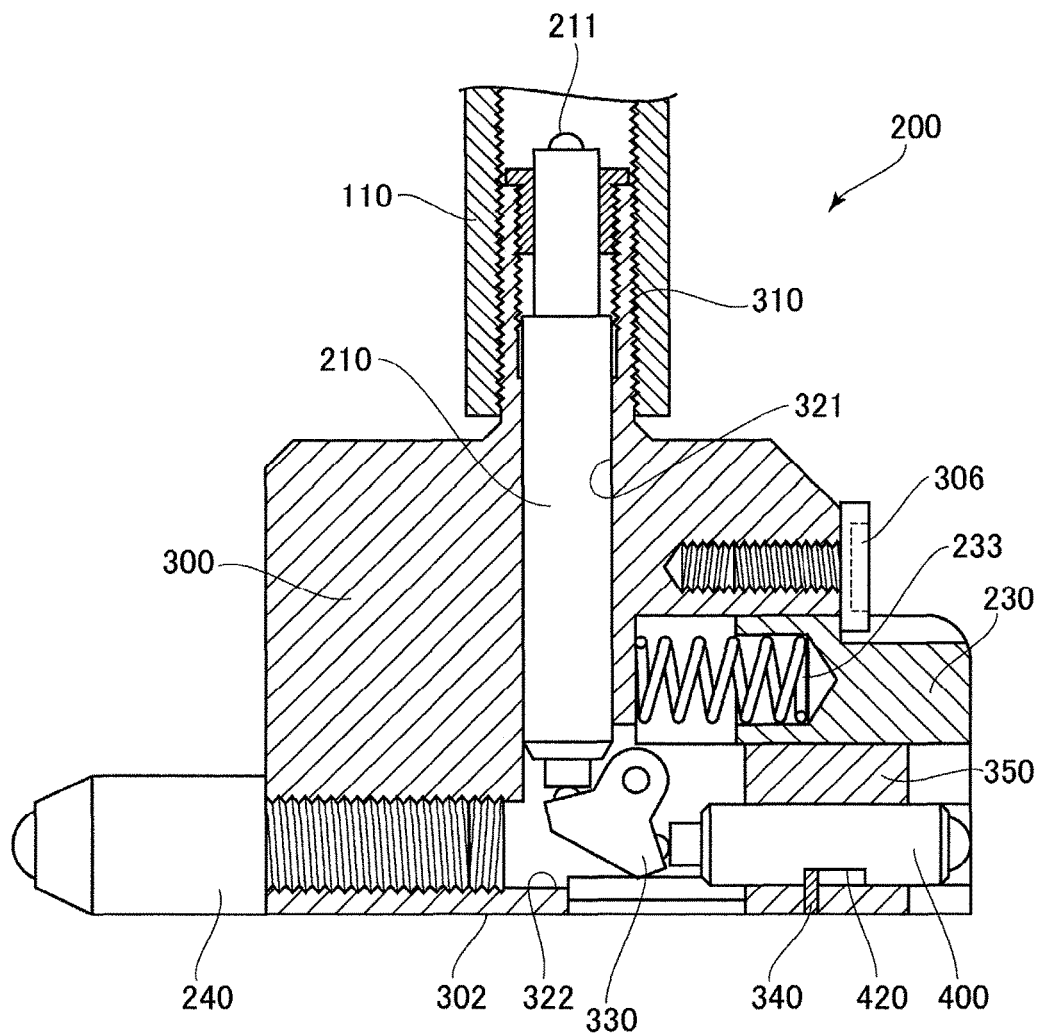
FIG. 3 is a cross-sectional view of the head part.
Figure 4:
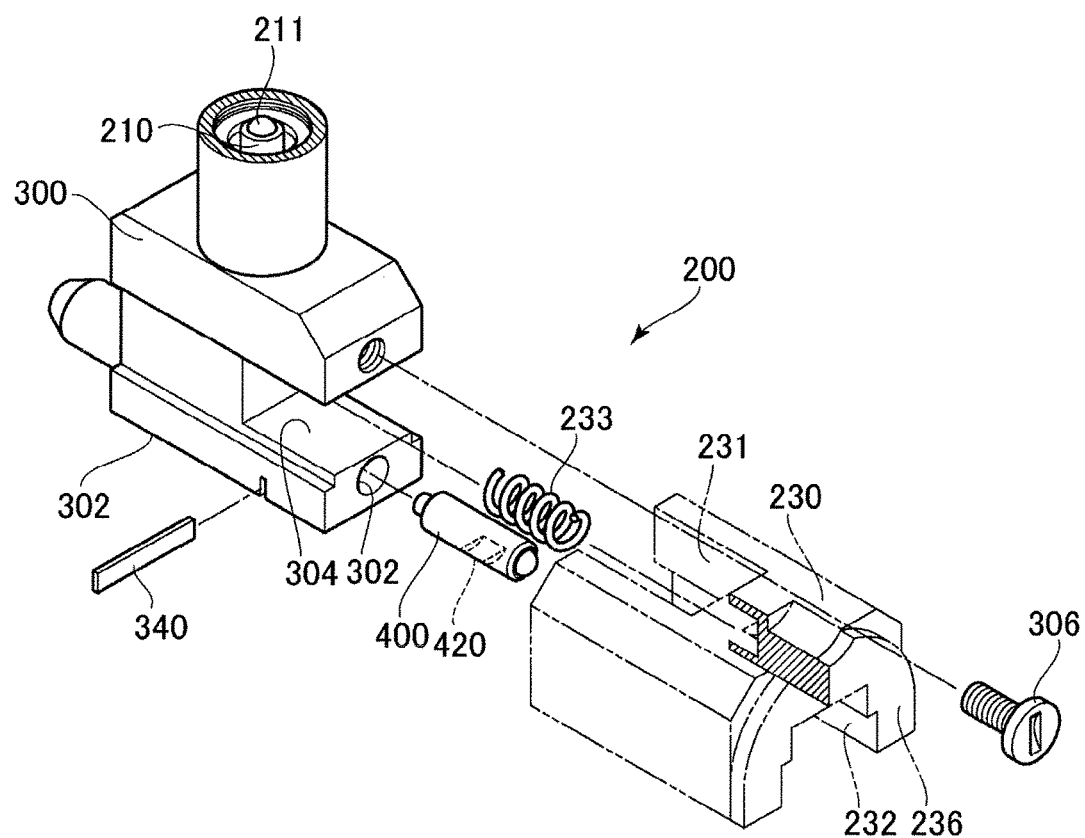
FIG. 4 is an exploded perspective view of the head part.
Figure 5:
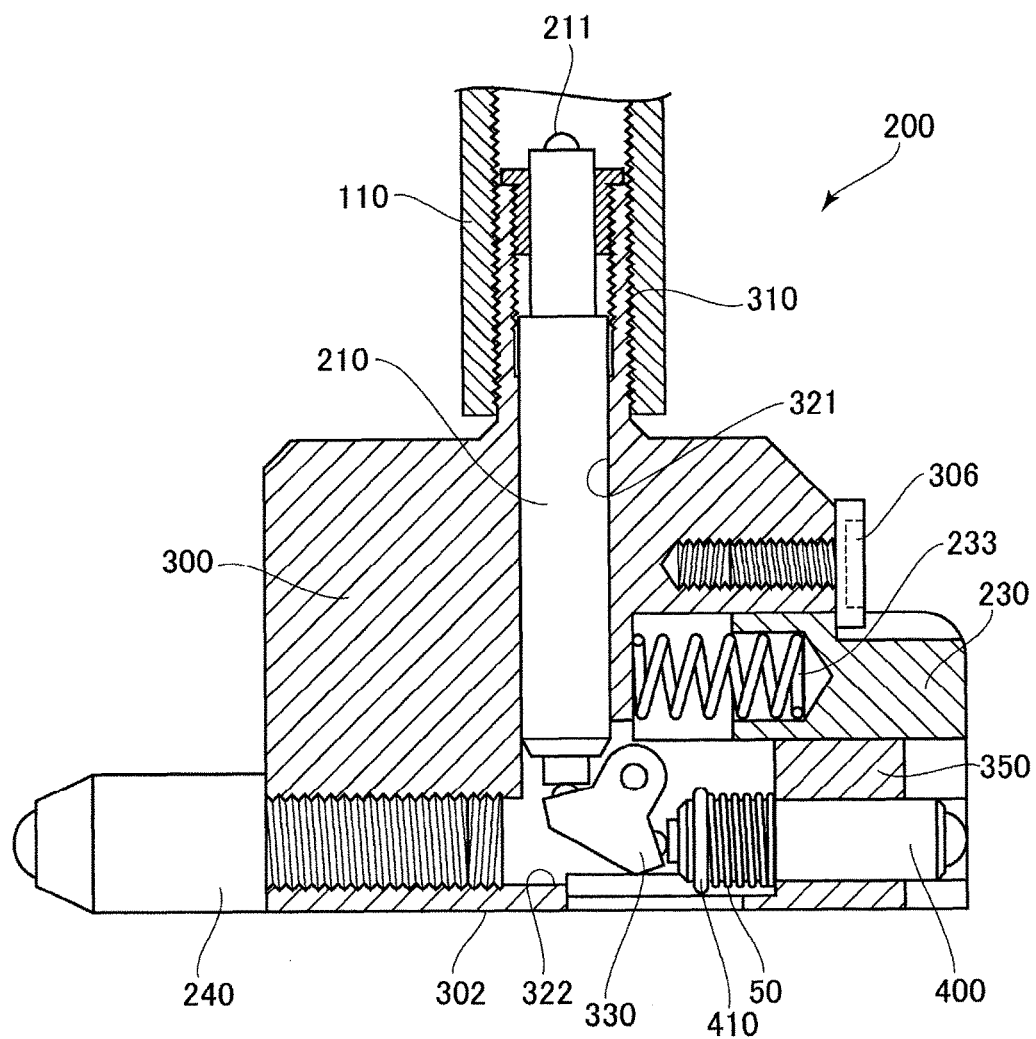
FIG. 5 is a diagram for explaining a problem.
Figure 6:
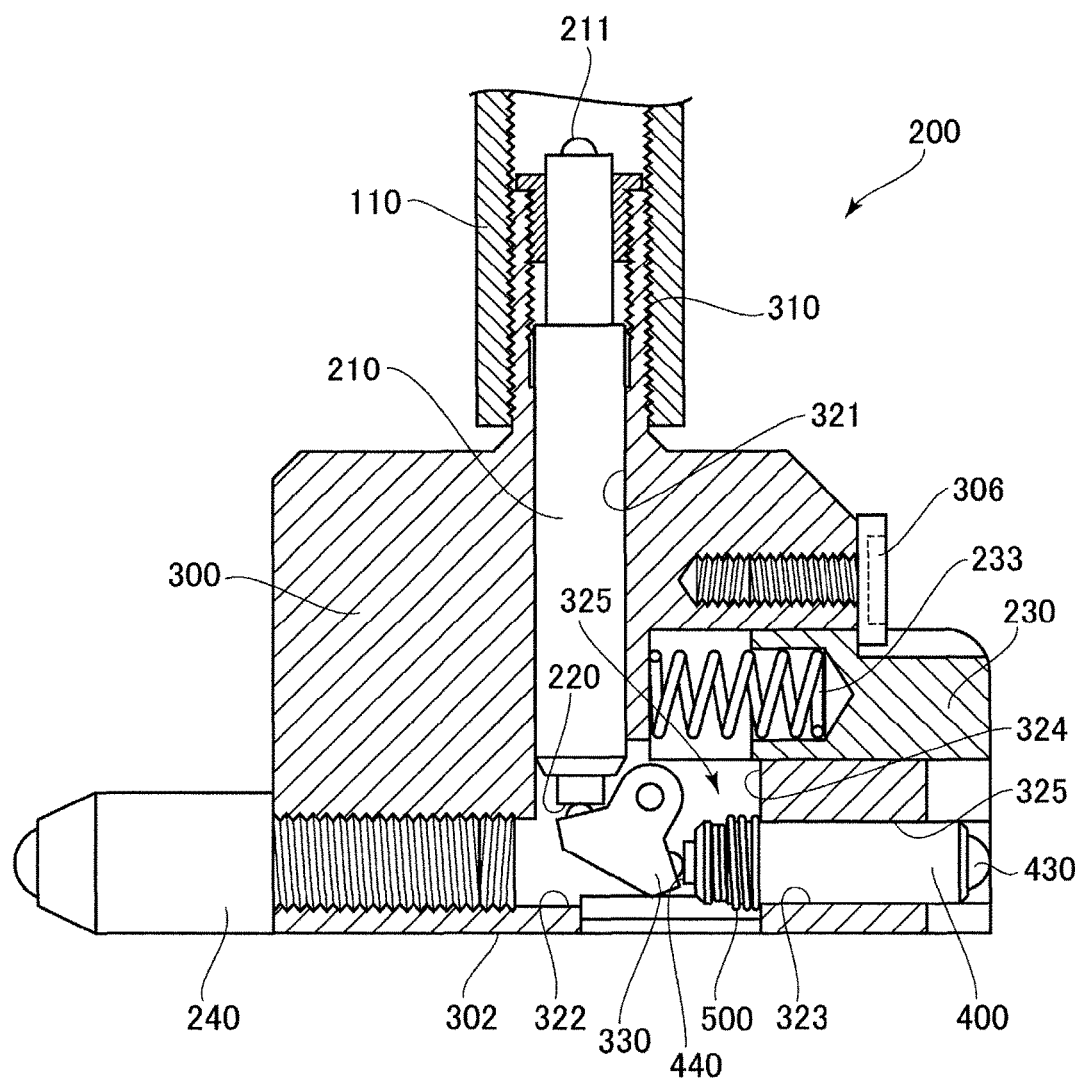
FIG. 6 is a cross-sectional view of the present exemplary embodiment.

A first characteristic of an exemplary embodiment of the present invention is that a third compression coil spring is interposed between a head main body part 300 and a gauge head 400 (see FIG. 6). Before the specific configuration of an exemplary embodiment of the present invention is described, a problem in the case where a common coil spring 50 is simply provided will be described with reference to FIG. 5.

As illustrated in FIG. 5, when the coil spring 50 is to be simply interposed between the head main body part 300 and the gauge head 400, the following problem occurs.

When the coil spring 50 is to be interposed between the head main body part 300 and the gauge head 400, a flange 410 for holding a spring can be provided on the gauge head 400, as illustrated in, for example, FIG. 5. Thus, the diameter of the gauge head 400 needs to be increased to provide the flange 410, and an excessive space is to be secured below the measurement axis, which is undesirable considering the purpose to measure a shallow hole.

Furthermore, if the coil spring 50 is interposed between the head main body part 300 and the gauge head 400, a holding part 350 of the gauge head 400 needs to be shorten to provide the coil spring 50. Then, the gauge head 400 may unstably function.

Moreover, if a partial protrusion, such as the flange 410, is provided on the gauge head 400, the machining man-hour is considerably increased (the cutting amount is increased). There may be various ideas if the gauge head 400 and the head main body part 300 could be more intricately machined. However, it is undesirable that the labor and cost for machining in the trend of falling prices.

Due to the above problem, although the thin-bottom type bore gauge 100 has the problem of the life, damping means has not been provided between the gauge head 400 and the head main body part 300.

Exemplary embodiments of the present invention will be illustrated and described with reference to reference signs assigned to elements in the drawings.

First Exemplary Embodiment

A first exemplary embodiment of the present invention will be described.

As illustrated in FIG. 6, the first characteristic of the present exemplary embodiment is that a third compression the coil spring 500 (see FIG. 6) is interposed between a head main body part 300 and a gauge head 400.

Figure 7:
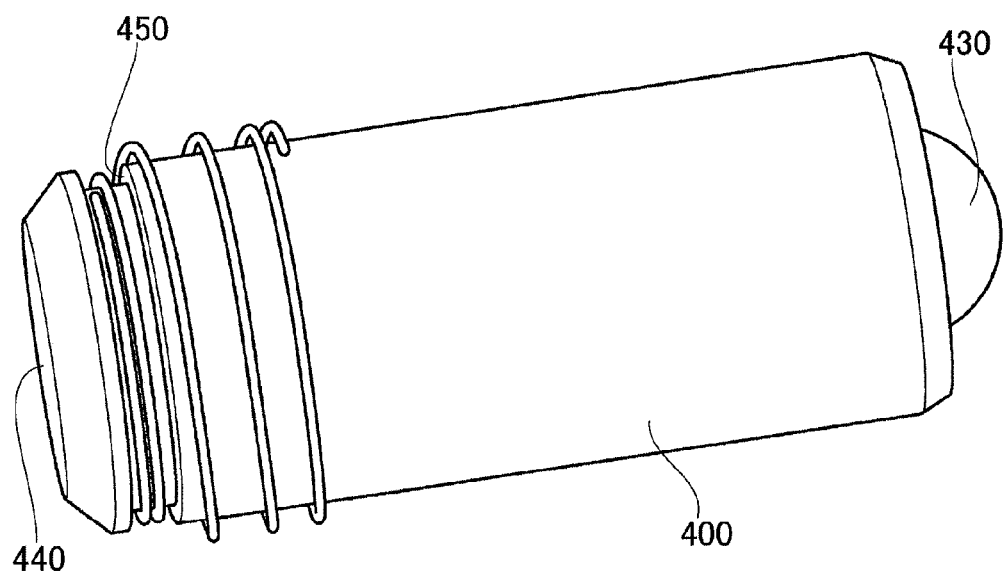
FIG. 7 is a diagram illustrating a gauge head of the present exemplary embodiment.
Figure 8:
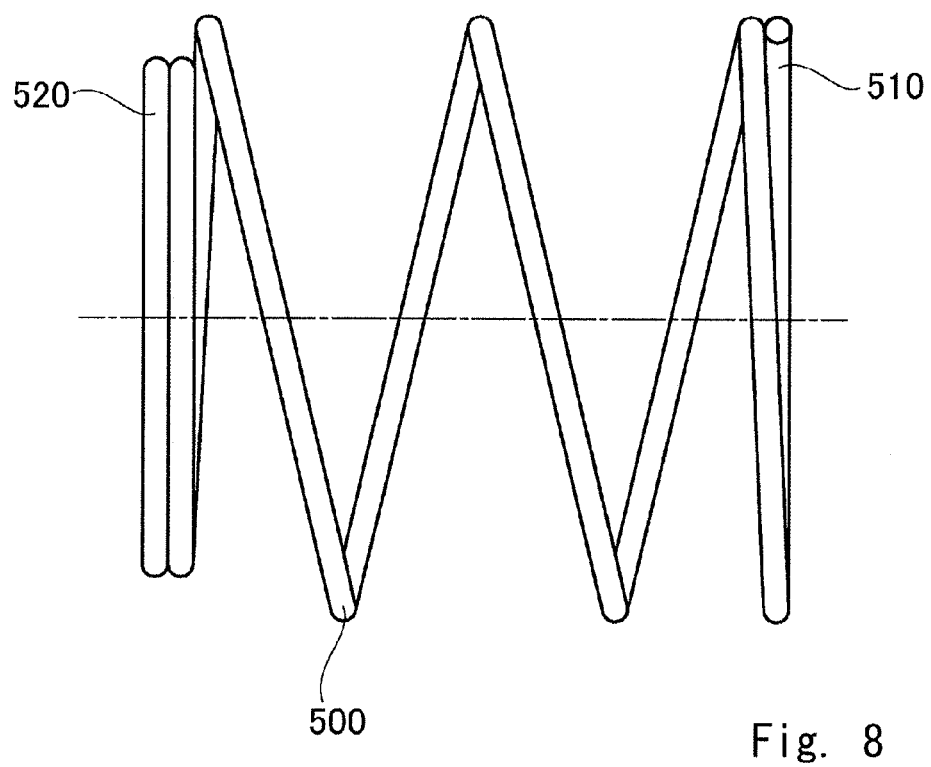
FIG. 8 is a diagram illustrating a third compression coil spring.

The present exemplary embodiment is illustrated in FIGS. 6 to 8.

In FIG. 6, the head main body part 300 includes a first hole 321 and a second hole 322 orthogonal to the first hole 321. At the crossing point of the first hole 321 and the second hole 322, the diameter of the first hole 321 is enlarged, and a cam 330 is disposed in a space formed thereby. The space will be referred to as a cam disposition space 325.

The gauge head 400 is slidably inserted to one side of the second hole 322 interposing the cam 330. Thus, the hole of the second hole 322 at the side where the gauge head 400 is disposed will be referred to as a gauge head hole 323. Note that, the inner face of the gauge head hole 323 is equivalent to a holding part 350 which holds the gauge head 400.

In the head main body part 300, the edge of the opening at the other side of the gauge head hole 323 is an end face 324 perpendicular to the axial line of the gauge head hole 323. The end face 324, which will be apparent from the later description, is an end face for holding the spring and will be referred to as a spring holding end face 324.

FIG. 7 is a diagram illustrating the gauge head 400 of the present exemplary embodiment.

The gauge head 400 has a columnar shape as a whole, and includes a measurement spherical face 430 on one end face and a cam contacting face 440 on the other end face. The cam contacting face 440 is brought into contact with the cam 330. The gauge head 400 includes a groove line 450, which is carved in the circumferential direction, at the other end side. The groove line 450, which will be apparent from the later description, is the groove for holding the spring and will be referred to as a spring holding groove 450.

Note that, a part to be engaged with the lock plate 340, such as a long groove 420, is not required in the present exemplary embodiment.

When the gauge head 400 is inserted into the gauge head hole 323, the spring holding groove 450 protrudes to the other side more than the spring holding end face 324. Then, the third compression coil spring 500 is attached between the spring holding groove 450 and the spring holding end face 324.

FIG. 8 is a diagram illustrating the third compression coil spring 500. In FIG. 8, the end turn part at the right side (one side) is brought into contact with the spring holding end face 324, and the end turn part at the left side (the other side) is engaged with the spring holding groove 450. The end turn part at the right side (the one side) will be referred to as a first end turn part 510, and the end turn part at the left side (the other side) will be referred to as a second end turn part 520.

The diameter of the third compression coil spring 500 is slightly larger than that of the gauge head 400, and the gauge head 400 is neatly accommodated inside the third compression coil spring 500. However, the diameter of the second end turn part 520 is smaller than the other parts, and the second end turn part 520 is fitted on the spring holding groove 450.

In the above described configuration, the third compression coil spring 500 biases the gauge head 400 to the other side by receiving the reaction from the spring holding end face 324. In other words, the third compression coil spring 500 biases the gauge head 400 in the direction opposite to the protruding direction, that is, in the direction in which the gauge head 400 is retracted. While a first compression coil spring (not illustrated) biases a spindle (not illustrated) or a lower rod 210 in the protruding direction (downward), the third compression coil spring 500 biases the gauge head 400 in the direction opposite to the force direction of the first compression coil spring (not illustrated).

Note that, the first compression coil spring (not illustrated) is stronger than the third compression coil spring 500.

In the above described configuration, while a thin bottom is maintained, it is possible to interpose the third compression coil spring 500 between the gauge head 400 and the head main body part 300. As the employed third compression coil spring 500, the diameter thereof is not fixed, but the diameter of the second end turn part 520 is small. For example, when a coil spring having a fixed diameter is used, the spring holding flange 410 needs to be provided on the gauge head 400 as illustrated in FIG. 5, and a thin bottom cannot be maintained. In contrast, a coil spring having a small diameter of the second end turn part 520 is employed in the present exemplary embodiment, the spring is held by the circumferential groove (spring holding groove) 450 at the gauge head 400 side accordingly. Thus, it is possible to provide damping means between the gauge head 400 and the head main body part 300 while a thin bottom is maintained.

Furthermore, the end turn part (the second end turn part 520) is engaged with the spring holding groove 450, which leads to more excellent space efficiency as compared to the case where, for example, the spring is held by the spring holding flange (see 410 in FIG. 5) and to securing the length of the holding part 350 as a result. Thus, the gauge head 400 stably functions.

The third compression coil spring 500 prevents the gauge head 400 from popping out, and a lock plate (stopper) is not required in the present exemplary embodiment. The working distance limit of the gauge head 400 is regulated by an elastic member which is the third compression coil spring 500, and the components (the lock plate 340 and the gauge head 400) do not collide with each other, which leads a long life and improvement of measurement precision.

Since the lock plate 340 is not required, a bottom face 302 of the head main body part 300 does not need to receive large force. Thus, it is possible to thin the bottom face 302 of the head main body part 300 accordingly.

Modified Example 1

In the above exemplary embodiment, it has been described that the first compression coil spring (not illustrated) is stronger than the third compression coil spring 500.

Conversely, the third compression coil spring 500 may be stronger than the first compression coil spring (not illustrated). In this case, the gauge head 400 is being retracted in the normal state. Thus, after the head part 200 is inserted into a hole or a groove which is a measurement target object W, the spindle (not illustrated) (or the lower rod) is slowly pressed down, and the measurement spherical face 430 is brought into contact with the measurement target object W.

Alternatively, the third compression coil spring 500 and the first compression coil spring (not illustrated) may have the substantially same strength.

Alternatively, the first compression coil spring (not illustrated) may not be provided. As long as the third compression coil spring 500 is provided, the spindle (not illustrated), the lower rod 210, and the gauge head 400 function in response to the movements of each other.

Modified Example 2

It is preferable that the cam contacting face 440 of the gauge head 400 and the cam contacting face 220 of the lower rod 210 are formed of materials having high hardness, such as ceramic. Not only the end faces but also the wholes of the gauge head 400 and the lower rod 210 may be formed of ceramic. When the third compression coil spring 500 is provided similarly to the above exemplary embodiments, the lower rod 210 and the gauge head 400 push each other interposing the cam 330 therebetween. Thus, the force applied to the cam contacting face 440 of the gauge head 400 and the cam contacting face 220 of the lower rod 210 becomes larger accordingly. Then, it is preferable that the cam contacting face 440 of the gauge head 400 and the cam contacting face 220 of the lower rod 210 are formed of materials having high hardness and excellent wear resistance. Furthermore, when the wholes of the lower rod 210 and the gauge head 400 are formed of materials having high hardness, such as ceramic, the wear of the whole sliding face is reduced, and the life of the bore gauge 100 is to be longer.

Note that, the ceramic is only required to have high hardness and excellent wear resistance, and a component material itself is not limited.

As an example, it is preferable that a sintered body having zirconia (ZrO2) or alumina (Al2O3) as the main component, and the hardness is HV 1200 or more.

Note that, the present invention is not limited to the above exemplary embodiments, and a configuration appropriately modified without departing from the spirit belongs to the technical scope of the present invention.

What is claimed is:

1. A head part of an inside measuring instrument which measures an inside of a measurement target object, the head part comprising:
   a head main body part; and
   a gauge head which includes a measurement spherical face on one end face and is slidably provided by penetrating an inside and an outside of the head main body part, wherein
   the gauge head includes a spring holding groove carved in a circumferential direction in the gauge head at the other end side of the gauge head opposite the measurement spherical face, and
   a compression coil spring is positioned around the gauge head with an end of the compression coil spring being positioned within the spring holding groove, the compression coil spring being interposed between the spring holding groove and an inside end face of the head main body part.

2. The head part of the inside measuring instrument according to claim 1, wherein
   the compression coil spring includes a diameter which accepts the gauge head inside thereof, and
   a diameter of an end turn part corresponding to the other end of the gauge head is smaller than other parts so as to be fitted on the spring holding groove.

3. The head part of the inside measuring instrument according to claim 1, further comprising:
   a rod which is movable in a direction orthogonal to a moving direction of the gauge head; and
   a cam provided between the other end of the gauge head and the rod, and rotatably supported about an axis by the head main body part, wherein
   end faces or wholes of the gauge head and the rod are ceramic.

4. A head part of an inside measuring instrument which measure an inside of a measurement target object, the head part comprising:
   a head main body part;
   a gauge head which includes a measurement spherical face on one end face and is movably provided by penetrating an inside and an outside of the head main body part, the gauge head including a spring holding groove carved in a circumferential direction in the gauge head at the other end side of the gauge head opposite the measurement spherical face;
   a compression coil spring is positioned around the gauge head with an end of the compression coil spring being positioned within the spring holding groove, the compression coil spring being interposed between the spring holding groove and an inside end face of the head main body part;
   a rod which is movable in a direction orthogonal to a moving direction of the gauge head; and
   a cam provided between the other end of the gauge head and the rod, and rotatably supported about an axis by the head main body part, wherein end faces or wholes of the gauge head and the rod are ceramic.

5. An inside measuring instrument comprising a head part according to claim 1.

6. The inside measuring instrument according to claim 5, further comprising:
   biasing means for biasing the rod in a direction toward a cam, wherein biasing force of the compression coil spring is the same as biasing force of the biasing means or more, and the head part further includes:
   a rod which is movable in a direction orthogonal to a moving direction of the gauge head; and
   the cam provided between the other end of the gauge head and the rod, and rotatably supported about an axis by the head main body part.

\* \* \* \* \*